US007131755B1

(12) United States Patent
Feng

(10) Patent No.: US 7,131,755 B1
(45) Date of Patent: Nov. 7, 2006

(54) TURN SIGNALS ON A FRONT-FORK SHOCK ABSORBER

(76) Inventor: Wei-Chung Feng, No. 151, Sheng Ping Street, Kaohsiung (TW) 800

( * ) Notice: Subject to any disclaimer, the term of this patent is extended or adjusted under 35 U.S.C. 154(b) by 0 days.

(21) Appl. No.: 11/175,142

(22) Filed: Jul. 7, 2005

(51) Int. Cl.
*B62J 6/00* (2006.01)
*F21V 7/04* (2006.01)

(52) U.S. Cl. ..................... 362/473; 362/549
(58) Field of Classification Search ............... 362/473; 340/425.5
See application file for complete search history.

(56) References Cited

U.S. PATENT DOCUMENTS 6,464,379 B1 * 10/2002 McKenna ................. 362/473
6,779,913 B1 * 8/2004 Niezrecki et al. ........... 362/473
6,789,927 B1 * 9/2004 Tracey ....................... 362/473
6,830,363 B1 * 12/2004 Pisula ........................ 362/474

* cited by examiner

*Primary Examiner*—Renee Luebke
*Assistant Examiner*—Evan Dzierzynski
(74) *Attorney, Agent, or Firm*—Bacon & Thomas

(57) ABSTRACT

A turn signal on a front-fork shock-absorber includes a shock-absorber fixed on the front-fork of the front wheel of a motorcycle, and a light emitter fixed in a recessed space formed on an outer surface of a hollow housing fitted around the front-fork rod. A light penetrable plate is closed on the recessed space, and the light emitter is connected by wires also connected with the circuit of the turn signals of a motorcycle after the wires extends through the hollow housing and through a tube route in the front-fork rod. So the light emitter is lit up blinking and synchronously with the turn signals of the motorcycle for making up an auxiliary warning for boosting traffic safety.

3 Claims, 10 Drawing Sheets

TURN SIGNALS ON A FRONT-FORK SHOCK ABSORBER

BACKGROUND OF THE INVENTION

1. Field of the Invention

This invention relates to turn signals on a front-fork shock-absorber, particularly to one to be fixed on a housing of a front-fork shock-absorber of a motorcycle and to be lit up synchronously with the turn signals of a motorcycle for boosting warning effectiveness to obtain more safety in running of the motorcycle.

2. Description of the Prior Art

Turn signals on automobiles and motorcycles are indispensable for indicating the direction to be turned for warning to keep traffic safe for walkers and vehicles on a road. The turn signals of a motorcycle are generally located at the right and the left side of a center light and of s taillight. So walkers and drivers coming from the front and from the rear of the motorcycle may be able to see the turn signals, but those walking or running at the two sides of the motorcycle may not be easy to see the turn signals owing to the position. So traffic accidents may be possible to occur for this reason. This is a flaw in the design of the existing turn signals, which is not so ideal and has to be improved to obtain true safety in riding a motorcycle.

SUMMARY OF THE INVENTION

The purpose of the invention is to offer a turn signal on a front-fork shock absorber, and the turn signal may be lit up synchronously with the turn signal of a motorcycle to boost traffic safety.

The feature of the invention is a light emitter fixed in a recessed space formed on an outer surface of a hollow housing fitted around a front-fork rod of the front wheel of a motorcycle. The light emitter is connected with the turn signal of the motorcycle by wires extending through a tube route in the front-fork rod. Then the light emitter may be lit up blinkingly and synchronously with the turn signal of the motorcycle as an auxiliary warning to boost traffic safety.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
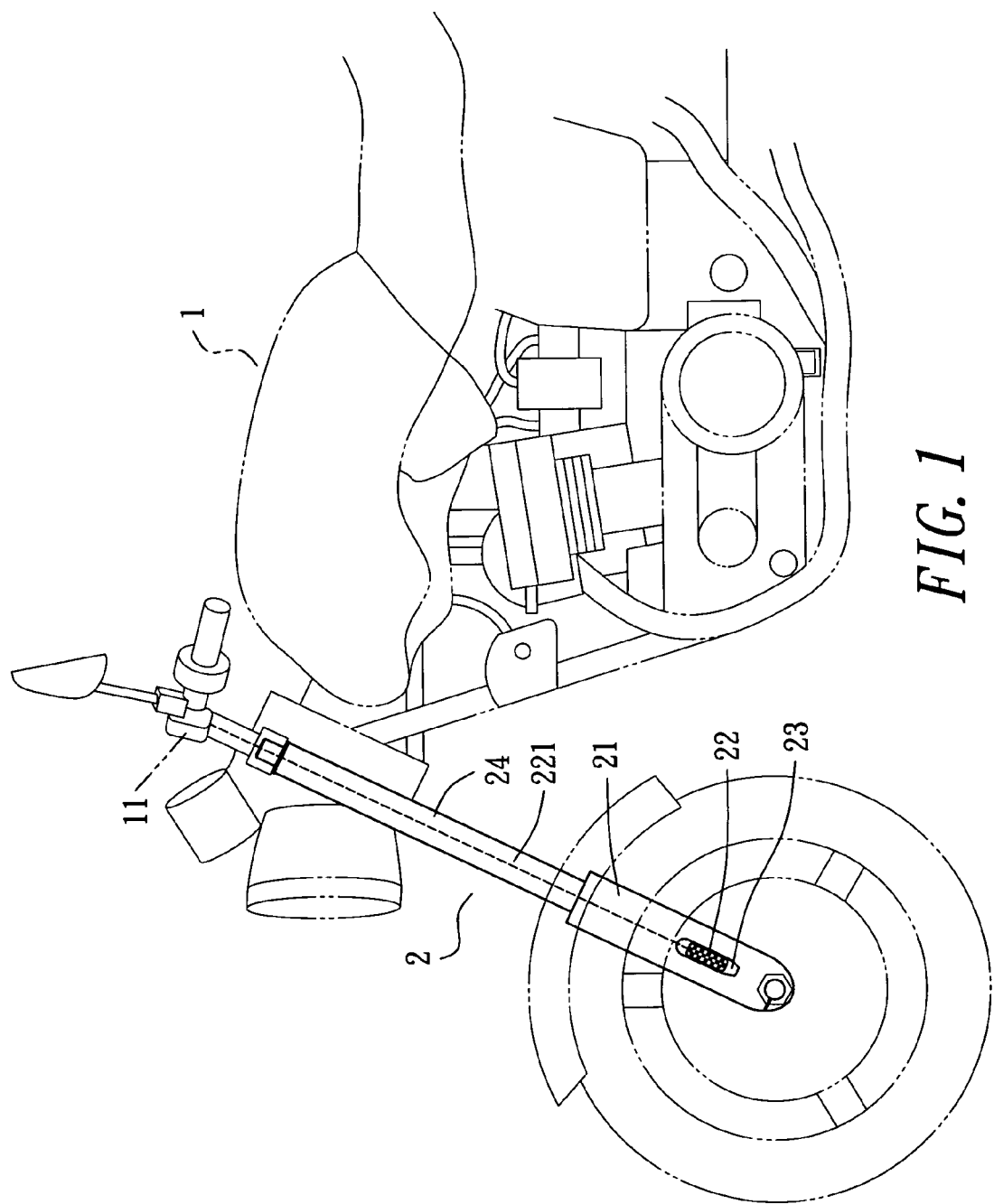
FIG. 1 is a side view of a turn signal on a front-fork shock absorber fixed on a motorcycle in the present invention.
Figure 2:
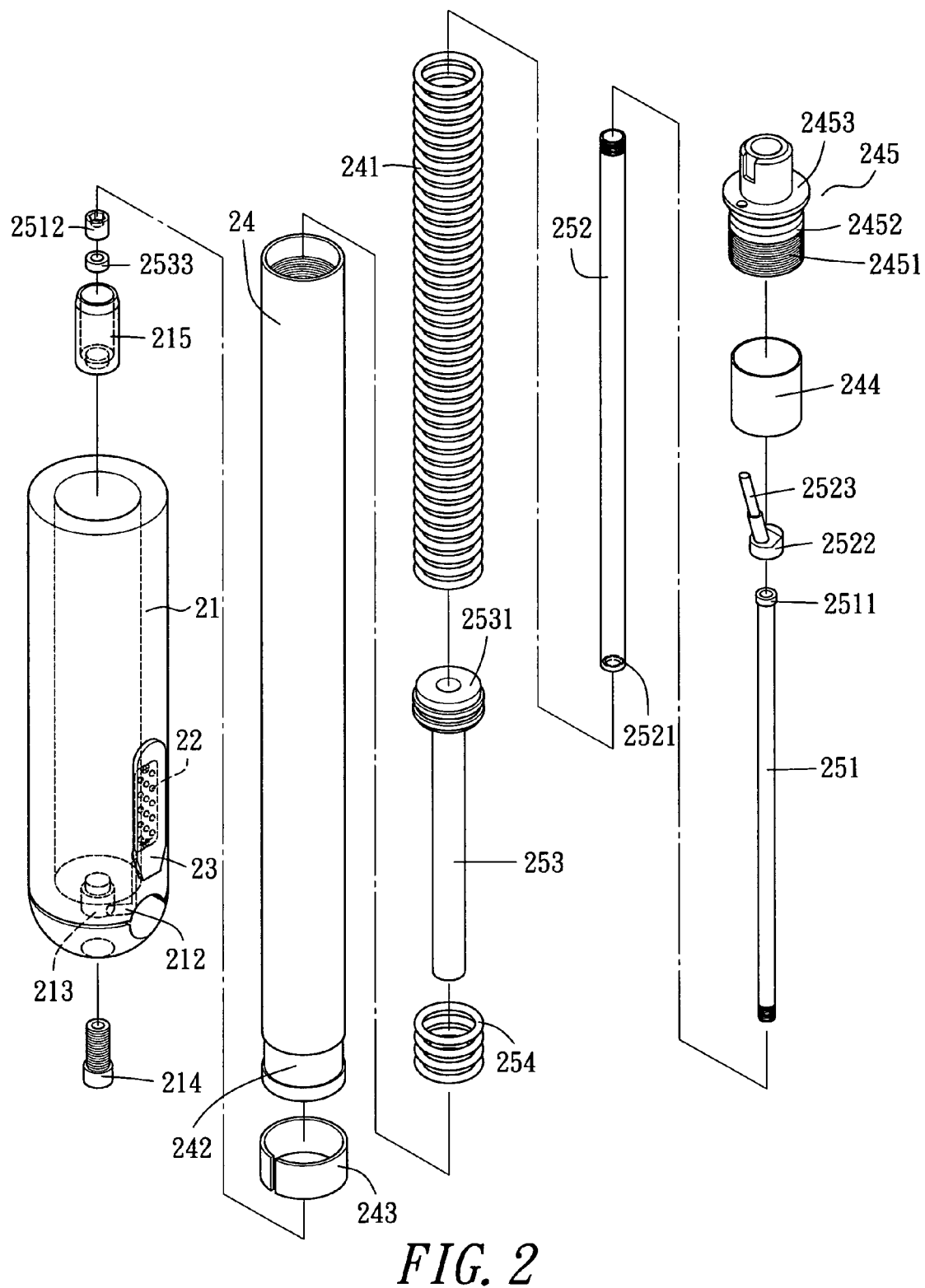
FIG. 2 is an exploded perspective view of the turn signal on a front-fork shock absorber in the present invention.
Figure 3:
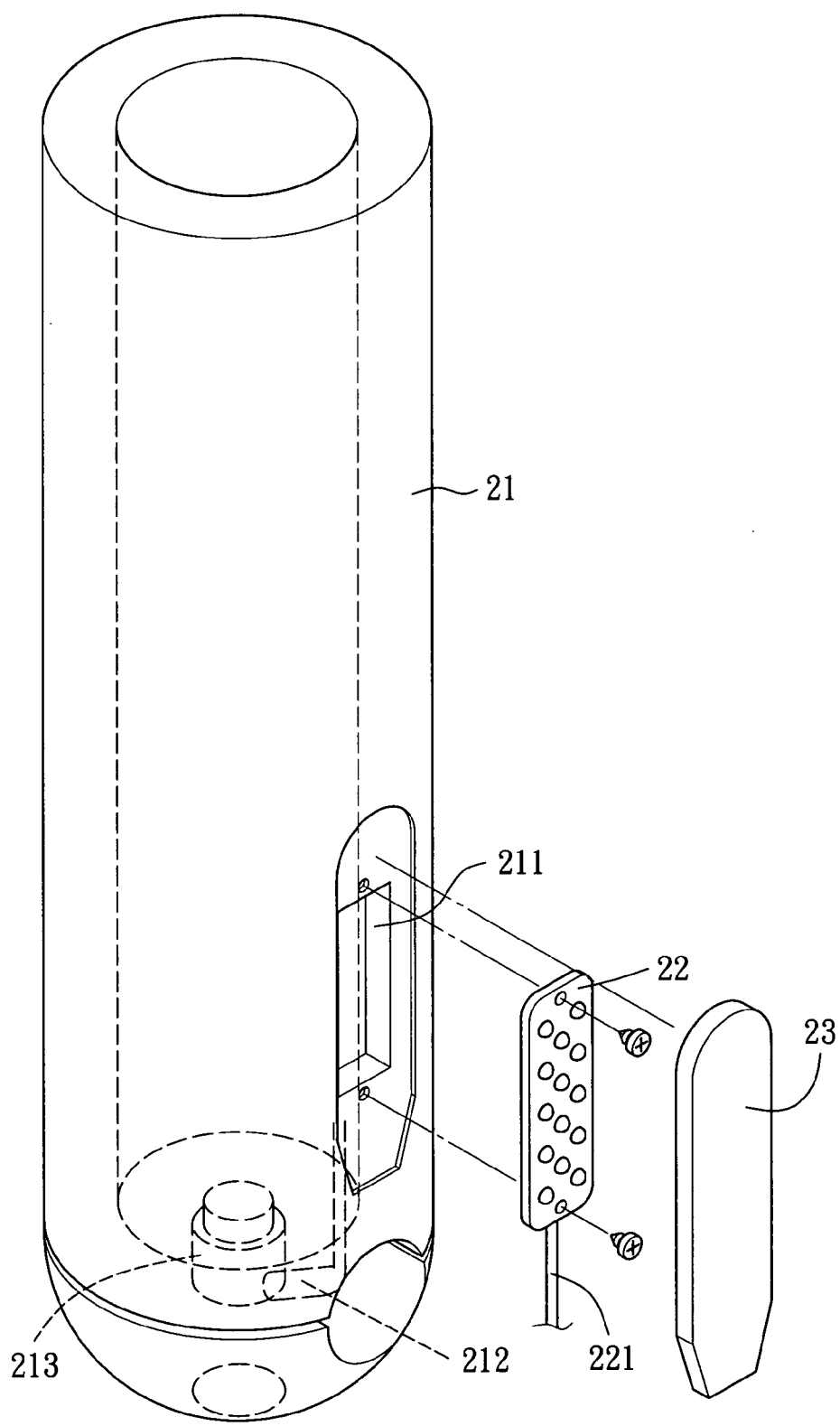
FIG. 3 is an exploded perspective view of the turn signal on a front-fork shock absorber in the present invention.

A preferred embodiment of a turn signal on a front-fork shock-absorber in the present invention, as shown in FIGS. 1, 2 and 3, is fixed on a front-fork shock-absorber 2 (shown in FIG. 1), including a hollow housing 21 fixed around a front-fork rod 24, a light emitter 22, a light penetrable plate 23, and wires 221.

The hollow housing 21 is provided with a recessed space 211 formed in an outer surface (as shown in FIGS. 2 and 3), a passageway 212 formed in the interior of the housing 21 and communicating with the recessed space 211, and the light emitter 22 is arranged in the recessed space 21 and closed by the light penetrable plate 23. The wires 221 are connected with the light emitter 22 and then extends through the passageway 212 and then through the tube route of the front-fork rod 24 (to be described later), and then connected with the circuit of the turn signals 11 of a motorcycle 1.

Figure 4:
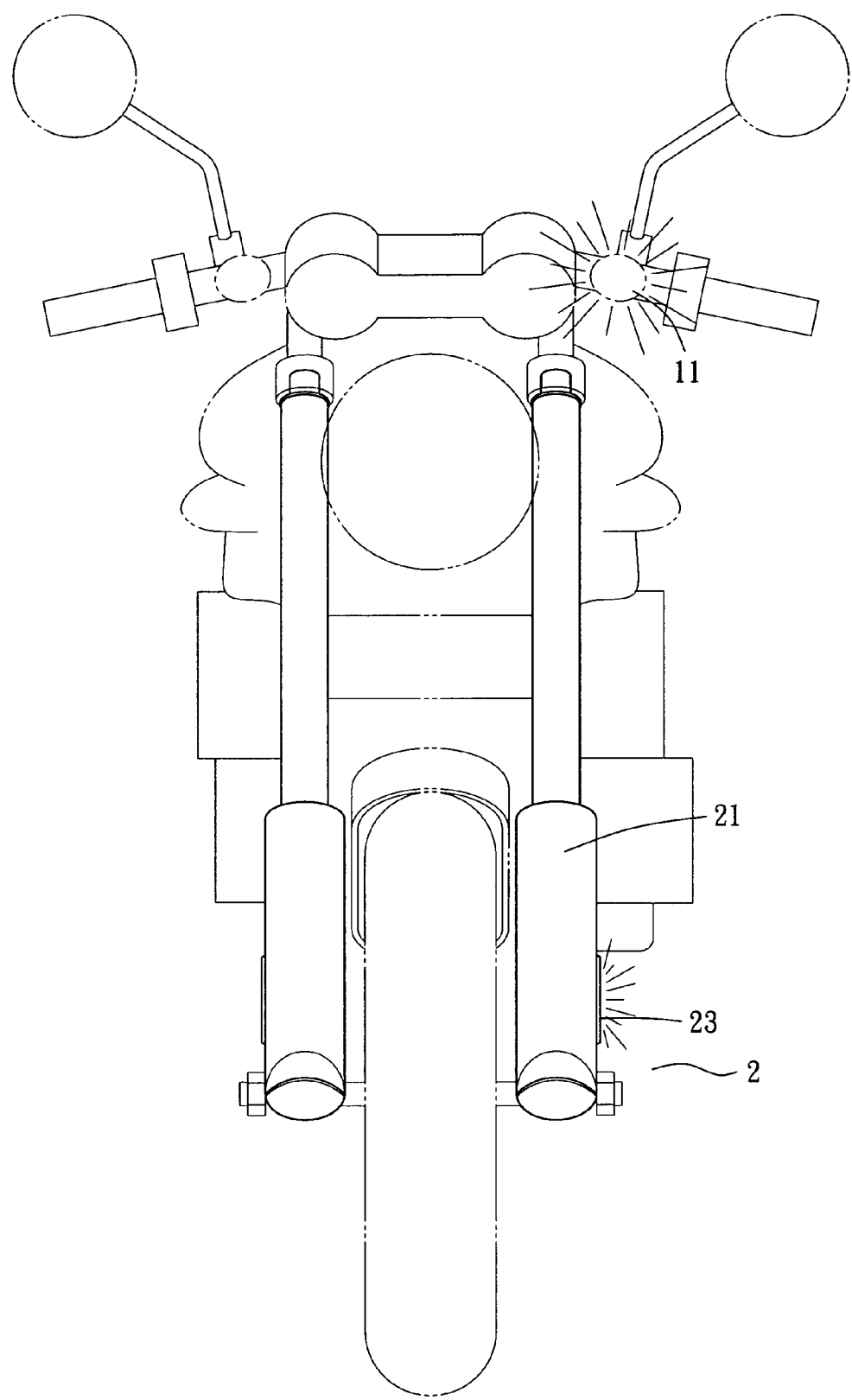
FIG. 4 is a front view of the turn signal on a front-fork shock absorber being used on a motorcycle in the present invention.
Figure 5:
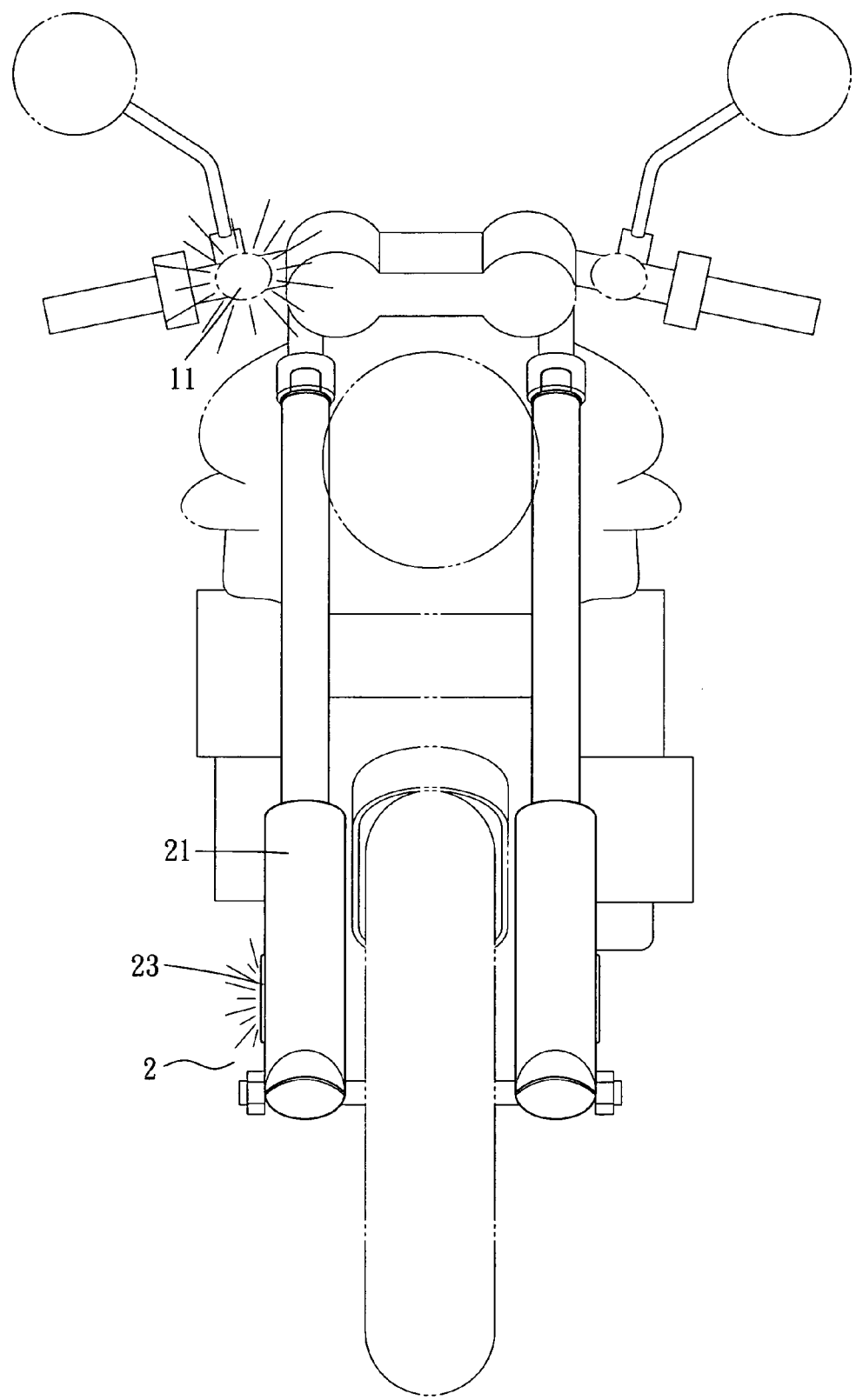
FIG. 5 is another front view of the turn signal on the front-fork shock absorber being used on a motorcycle in the present invention.

Next, as the wires 221 of the light emitter 22 is connected with the circuit of the turn signal 11 of the motorcycle 1, so when the turn signal 11 is powered by a rider of the motorcycle 1 to blink on-and-off, (referring to FIGS. 4 and 5), the light emitter 22 may be lit up synchronously and shine through the light-penetrable plate 23 and also blink. Therefore, persons just walking and drivers just running at the two sides of the motorcycle, the right and the left side may be able to see clearly the turn signal on the front-fork shock-absorber so as to pay more their attention, resulting in safer traffic. In addition, as the wires 221 of the light emitter 23 are connected with the circuit of the turn signal 11 of the motorcycle 1, the light emitters 22 can be lit up and blink together with the two side turn signals 11 when they are lit up, making up double warning effect.

Figure 6:
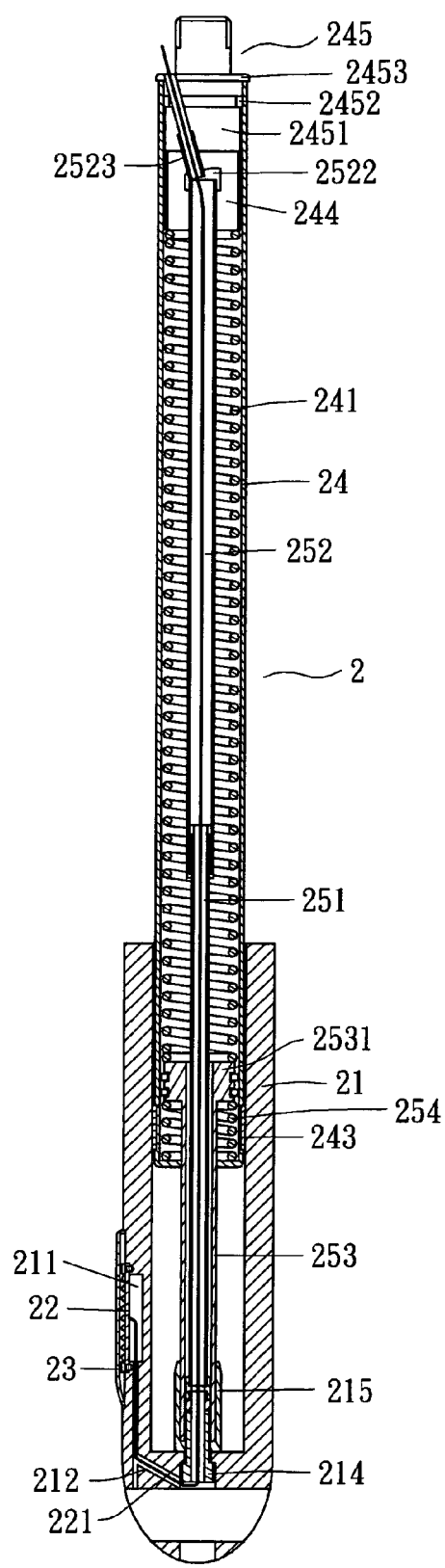
FIG. 6 is a cross-sectional view of the turn signal on the front-fork shock absorber in the present invention.
Figure 7:
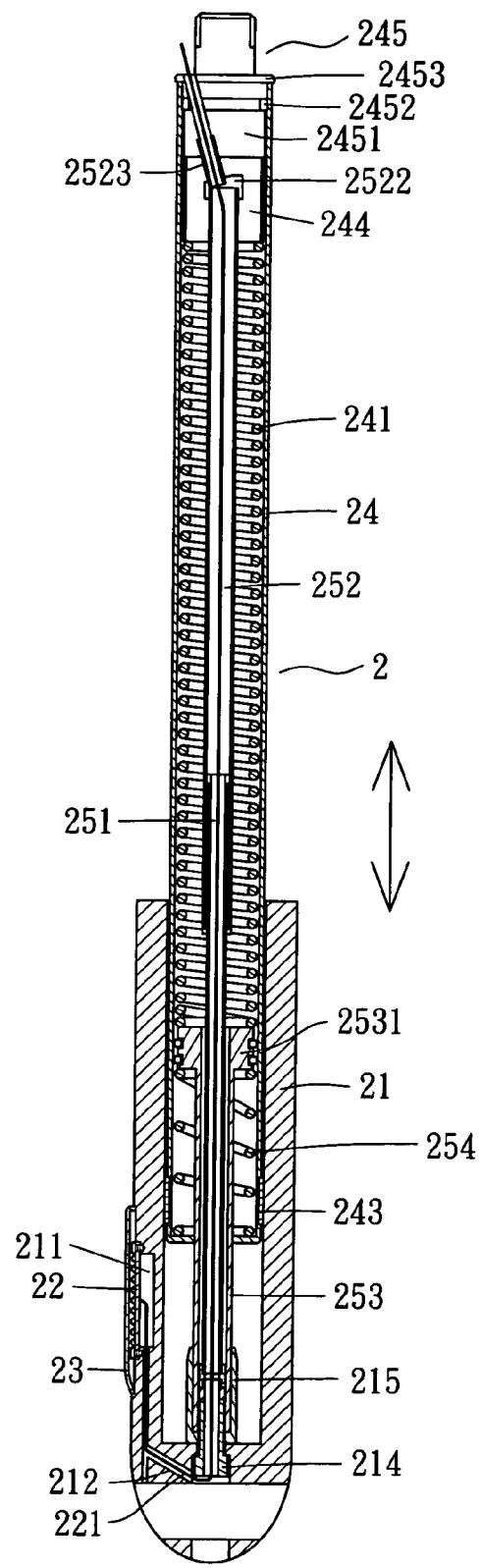
FIG. 7 is a cross-sectional view of the front-fork shock absorber being in function in the present invention.
Figure 8:
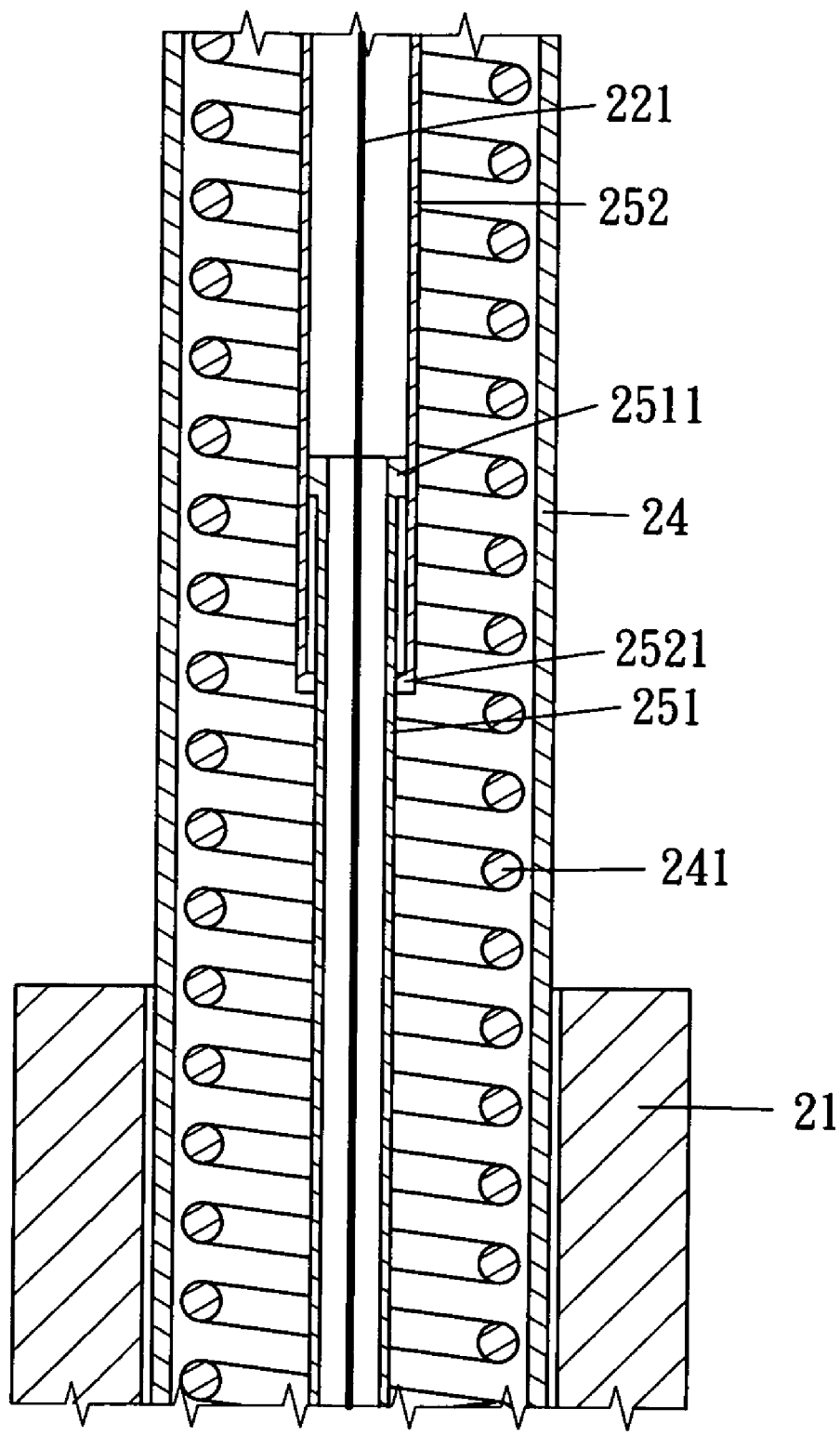
FIG. 8 is a magnified cross-sectional view of the intermediate portion of the turn signal in the present invention.

As seen from the aforesaid description, the wires 221 of the light emitter 22 are laid to connect with the turn signals 11 of the motorcycle 1, so the wires 221 must pass through the tube route set in the interior of the front-fork rod 24, referring to FIGS. 2, 6–10. The tube route in the front-fork rod 24 is formed with an inner telescoping tube 251 and an outer telescoping tube 252 combined with each other. An outer stop ring 2511 is provided around the upper end of the inner telescoping tube 251, and the outer diameter of the outer stop ring 2511 is tantamount to the inner diameter of the outer telescoping tube 252, so the outer stop ring 2511 of the inner telescoping tube 251 may slide down along the inner wall of the outer telescoping tube 252 after the inner telescoping tube 251 is inserted in the outer telescoping tube 252. Further, the outer telescoping tube 252 has an inner stop ring 2521 at an open bottom end, and the inner diameter of the inner stop ring 2521 is tantamount to the outer diameter of the inner telescoping tube 251 (as shown in FIG. 8). Then after the inner telescoping tube 251 is combined in the outer telescoping tube 252, the bottom end of the inner telescoping tube 251 extends down through the bottom end of the outer telescoping tube 252 and further inserts in a pipe 253, which has a stop ring 2531 of a larger diameter than the pipe 253 itself formed around the top end. The stop ring 2531 is fitted around by plural seal rings 2532. Then a spring 241 is fitted around the inner telescoping tube 251 and the outer telescoping tube 252 on the stop ring 2531, and then a spring 254 is fitted around the lower portion of the stop ring 2531. Then all those components combined together are placed in the front-fork rod 24, with the pipe 253 extending out of the bottom hole of the front-fork rod 24. The front-fork rod 24 further has a seal 243 fitted around a recess 242 formed in lower portion, then inserted in the housing 21, with the seal 243 closely resting around the inner wall of the housing 21.

Figure 9:
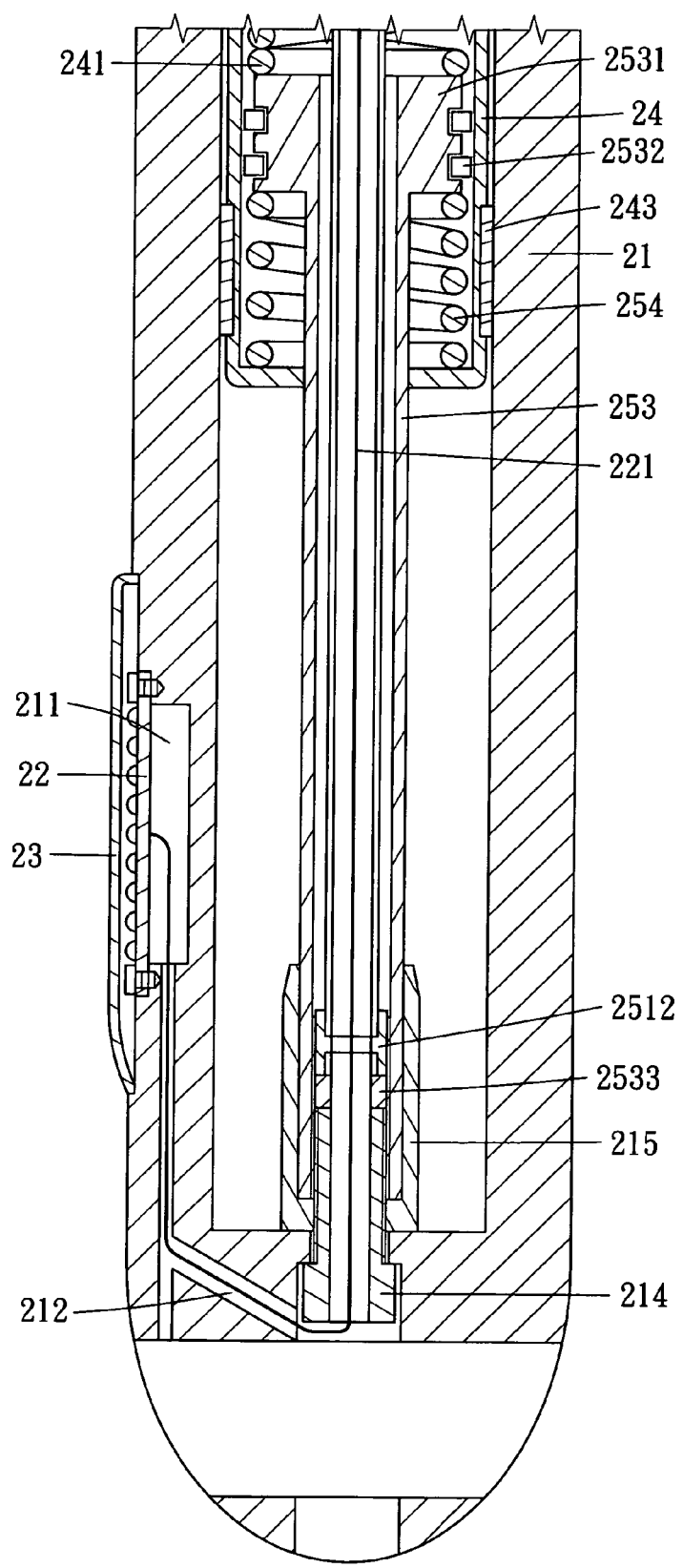
FIG. 9 is a magnified cross-sectional view of the lower portion of the turn signal in the present invention; and, FIG. 10 is a magnified cross-sectional view of the upper portion of the turn signal in the present invention.

Next, as shown in FIG. 9, the hollow housing 21 has a threaded hole 213 formed in a lower end for a bolt 214 with a center hole to screw with. After the bolt 214 is screwed in the threaded hole 213 of the housing 21, a fix nut 215 engages with the threads of the bolt 214 first, and then the lower end of the pipe 253 is inserted in the inner wall of the fix nut 215. Then the lower end of the pipe 253 is fitted around with a H-shaped fix ring 2512, and the outer wall of the H-shaped fix ring 2512 is positioned in the inner wall of the pipe 253, with the upper threads of the bolt 214 engaging with the inner wall of the lower end of the pipe 253, and with a washer 2533 capping on its top and also locating under the H-shaped fix ring 2512. The washer 2533 and the fix ring 2512 both have a center through hole to let the center hole of the bolt 214 to communicate with the inner telescoping tube 251, so the wires 221 can extend through the passageway 212 into the center hole of the bolt 214, the center holes of the washer 2533 and the fix ring 2412 to finally into the inner telescoping tube 251 and then into the outer telescoping tube 252.

Figure 10:
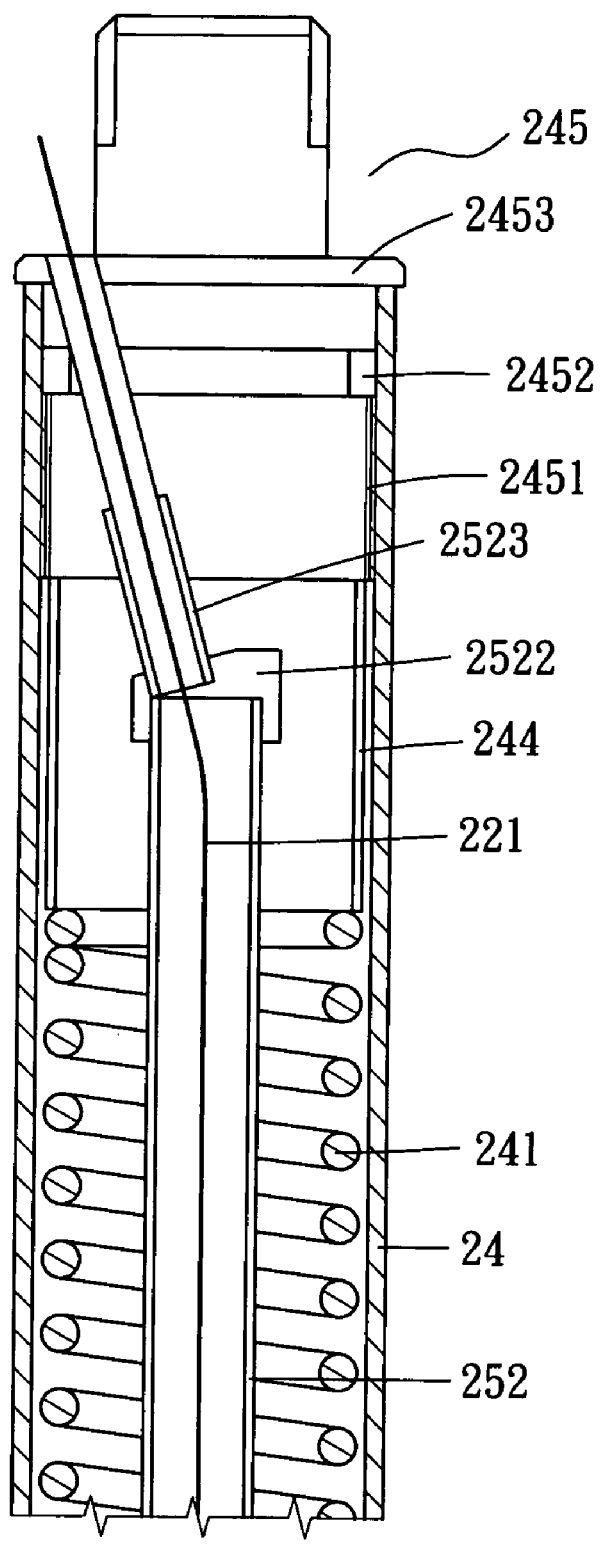

Next, as FIG. 10 shows, the top of the outer telescoping tube 252 is fitted around with a cap 2522, and an oblique tube 2523 is fixed in the cap 2522 for the wires 221 to pass upward through. Then a cylindrical sleeve 244 is fixed in the upper portion of the front-fork rod 24 for stopping the upper end of the spring 241, and then a fix cap 245 with a male threaded post 2451 is screwed inward, with the threaded post 2451 engaging with the female threads of the front-fork rod 24 and also stopping the cylindrical sleeve 244. Further, an O-shaped ring 2452 is placed on the top of the male threaded post 2451, and a upper cap 2453 is closed on the O-shaped ring 2452, just closing the front-fork rod 24, with the oblique tube 2533 passing upward through the cap 2453 to enable the wires 221 extend through the oblique tube 2533 and out of the front-fork rod 24 to be connected with the turn signals 11.

Next, oily liquid is filled in the space between the front-fork rod 24 and the housing 21, functioning to absorb shock, but not entering the inner telescoping tube 251. During motorcycle's running, the force of the shock is born and dispersed by the springs 241 and 254 (as shown in FIGS. 6 and 7), so the wires 221 may only be pressed, but not affected in their conductivity. Therefore, the power of the turn signal 11 can be transmitted synchronously to the light emitter 22 through the wires 221 extending through the tube route described above for synchronous lighting with the turn signal 11 of the motorcycle 1, boosting traffic safety for a large extent.

While the preferred embodiment of the invention has been described above, it will be recognized and understood that various modifications may be made therein and the appended claims are intended to cover all such modifications that may fall within the spirit and scope of the invention.

What is claimed is:

1. An auxillary turn signal on a front-fork shock-absorber comprising a shock absorber fixed on the front-fork rod of a front wheel of a motorcycle and a light emitter, said shock absorber composed of a hollow housing fitted around said front-fork rod and characterized by a recessed space formed on an outer surface, said light emitter fixed in said recessed space, a light penetrable plate closed on said recessed space, wires connected with said light emitter and extending to expose out of said housing and further passing through a tube route in said front-fork rod to be connected with a circuit of turn signals of said motorcycle; said light emitter lit up blinkingly and synchronously with said turn signal of said motorcycle when said turn signal of said motorcycle is lit up, said light emitter lit up to make up auxiliary warning for boosting warning effect and traffic safety.

2. The turn signal on a front-fork shock absorber as claimed in claim 1, wherein a passageway is provided under a bottom side of said recessed space, communicating with the interior of said hollow housing.

3. The turn signal on a front-fork shock-absorber as claimed in claim 1, wherein said tube route provided in said front-fork rod is mainly composed of an inner telescoping tube and an outer telescoping tube combined with each other in the interior of said front-fork rod, said inner telescoping tube extends through a lower end of said outer telescoping tube, further passing through a tube in a pipe that has a stop ring of a larger diameter formed in an upper end, said stop ring placed in and resting tightly around an inner wall of said front-fork rod, said tube in said pipe is fitted around with a spring and then extends out of a bottom end of said front-fork rod, said inner telescoping tube and said outer telescoping tube located on said stop ring are fitted with a spring, and then said inner and said outer telescoping tube together with said spring are inserted in said front-fork rod; said hollow housing has a threaded hole in a bottom end for a bolt with a center hole to engage with, said bolt with a center hole has its threads for a fix nut to screw with; said pipe has its bottom end inserted in an inner wall of said fix nut, and said bolt with a center hole has its upper threads engaging with an inner wall of a bottom end of said pipe, with a washer and a H-shaped fix ring resting on said fix nut, and with a bottom end of said inner telescoping tube inserted in place in said H-shaped fix ring; said washer and said H-shaped fix ring have a center hole communicating with the center hole of said bolt; a cap is closed on the top of said outer telescoping tube and has an oblique tube extending upward, said front-fork rod has its top fitted around with a sleeve to push against a spring, and a threaded cap closes said front-fork rod, pushing against said sleeve and letting said oblique tube expose out of said front-fork rod.

* * * * *